Aug. 8, 1933.    G. F. DALY    1,921,454
TOTAL TAKING MECHANISM
Filed June 11, 1929    4 Sheets-Sheet 1

FIG. I.

Aug. 8, 1933.   G. F. DALY   1,921,454
TOTAL TAKING MECHANISM
Filed June 11, 1929   4 Sheets-Sheet 2

Aug. 8, 1933.　　　　　G. F. DALY　　　　　1,921,454
TOTAL TAKING MECHANISM
Filed June 11, 1929　　　　4 Sheets-Sheet 3

Inventor
George F. Daly
By his Attorney
W. M. Wilson

Aug. 8, 1933.  G. F. DALY  1,921,454
TOTAL TAKING MECHANISM
Filed June 11, 1929  4 Sheets-Sheet 4
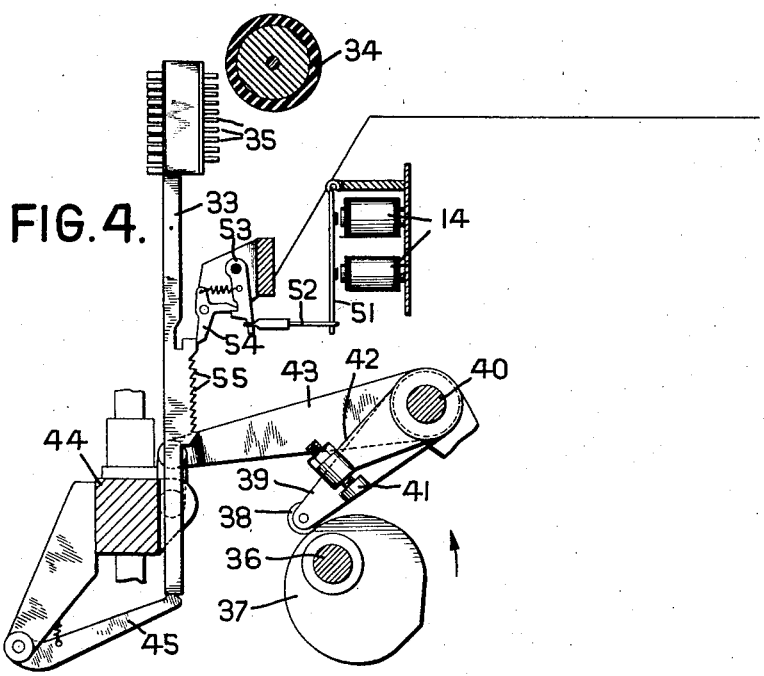
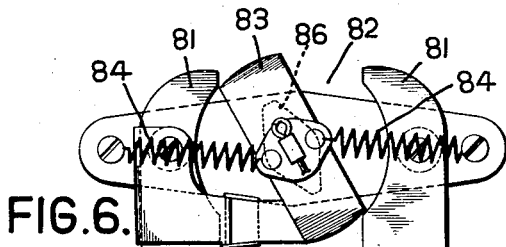
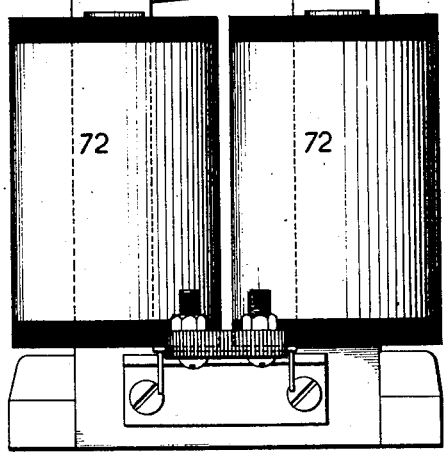
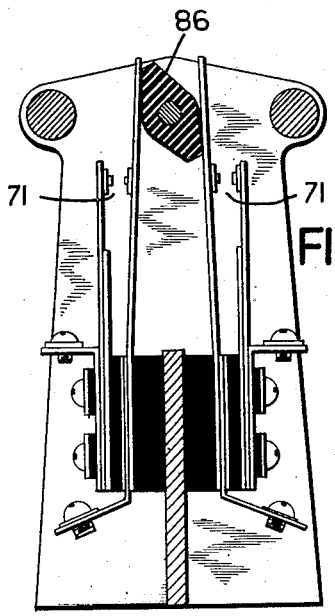

Patented Aug. 8, 1933

1,921,454

UNITED STATES PATENT OFFICE 1,921,454

TOTAL TAKING MECHANISM

George F. Daly, Johnson City, N. Y., assignor to The Tabulating Machine Company, Endicott, N. Y., a Corporation of New Jersey Application June 11, 1929. Serial No. 369,965

14 Claims. (Cl. 235—92)

The invention concerns accounting machines and has for its principal object the provision of an improved and simplified mechanism for taking a reading from one data representing device and controlling another device in accordance with the reading.

Another object of the invention is to provide a novel electrically controlled total taking mechanism for accounting machines in which the electrical controlling circuits are considerably simplified over those previously in use.

Another object is to provide an electrically operated total taking mechanism for a multidenominational accumulator in which a common wire or bus suffices to supply the reading current for similar readings on all denominational orders.

Another object is to provide an electrically operated total taking mechanism for a multidenominational accumulator in which the total taking readings are derived in the form of timed impulses and in which an emitting device is provided for initiating the timed impulses.

Another object is to provide a total taking device according to the last preceding object in which each denominational order accumulating element is provided with mechanism to select only such emitted impulses as correspond with its readings.

Another object is to provide a total taking mechanism in accordance with the last two preceding objects in which the denominational order impulse selecting mechanism consists of a commutator and brush devices settable according to the data entered into a denominational order accumulator element.

The invention is concerned with reading out data which stands on the elements of a mechanism for receiving and retaining entries ordinarily for accumulating. While the device has heretofore been referred to as a total taking mechanism and will be designated as such in the following description it will be understood that in its broadest aspects this term is used simply to indicate that the device is adapted to determine the position of a data receiving element and control another manifesting element, such as for example a printer, in accordance with such position regardless of whether the position represents a total of items, a single item or other data.

For the purpose of properly disclosing the invention it will be shown applied to the accumulating mechanism of an electrical tabulator of the type disclosed in the patent of Daly and Page, No. 1,762,145, granted June 10, 1930. Each counter wheel of the accumulator may be provided with a commutator having a segment corresponding to each significant figure indication of the counter wheel. A brush may be geared to the counter wheel so that it always rests on the commutator segment corresponding to the digit reading of the wheel. Each of these brushes may be connected to the printer magnet of the counter wheel to select the proper type for printing during total taking. An impulse emitting device is provided coordinated with nine separate lines which are allotted to the nine significant digits and the emitter is arranged to supply impulses to these lines at a point in the machine operation corresponding to the digit value which they represent. Thus the "9" line receives an impulse timed to select a nine for printing, the "8" line receives an impulse timed to select the eight type for printing, and so on. All the commutator segments corresponding to the "9" position of the counter wheels are connected to the "9" impulse line from the emitter, all the "8" segments are likewise connected with the "8" line, and so on. Thus it will be understood that the printer magnets of all counter wheels which stand at "9" will receive an impulse for "9" printing, all those that stand at "8" will receive an impulse for "8" printing, and so on. It will be clear that the invention provides for a greater simplification of the wiring as nine leads only are used for the entire selecting system for energizing the printer magnets. While this particular application of the invention has been selected for illustration so that the operation of the device may be explained in connection with a concrete example, it is obvious that other forms of entry retaining devices may be substituted for the accumulators and other forms of manifesting devices may be substituted for the printers.

The invention is illustrated in the accompanying drawings which should be read in connection with the following detailed description in which the same reference characters apply to the same parts throughout the similar views and in which, Fig. 1 is a circuit diagram of an electrical tabulator with a total taking device embodying the principles of the present invention;

Fig. 4 is an illustration of the printing mechanism showing the parts involved in total printing;

Figure 1:
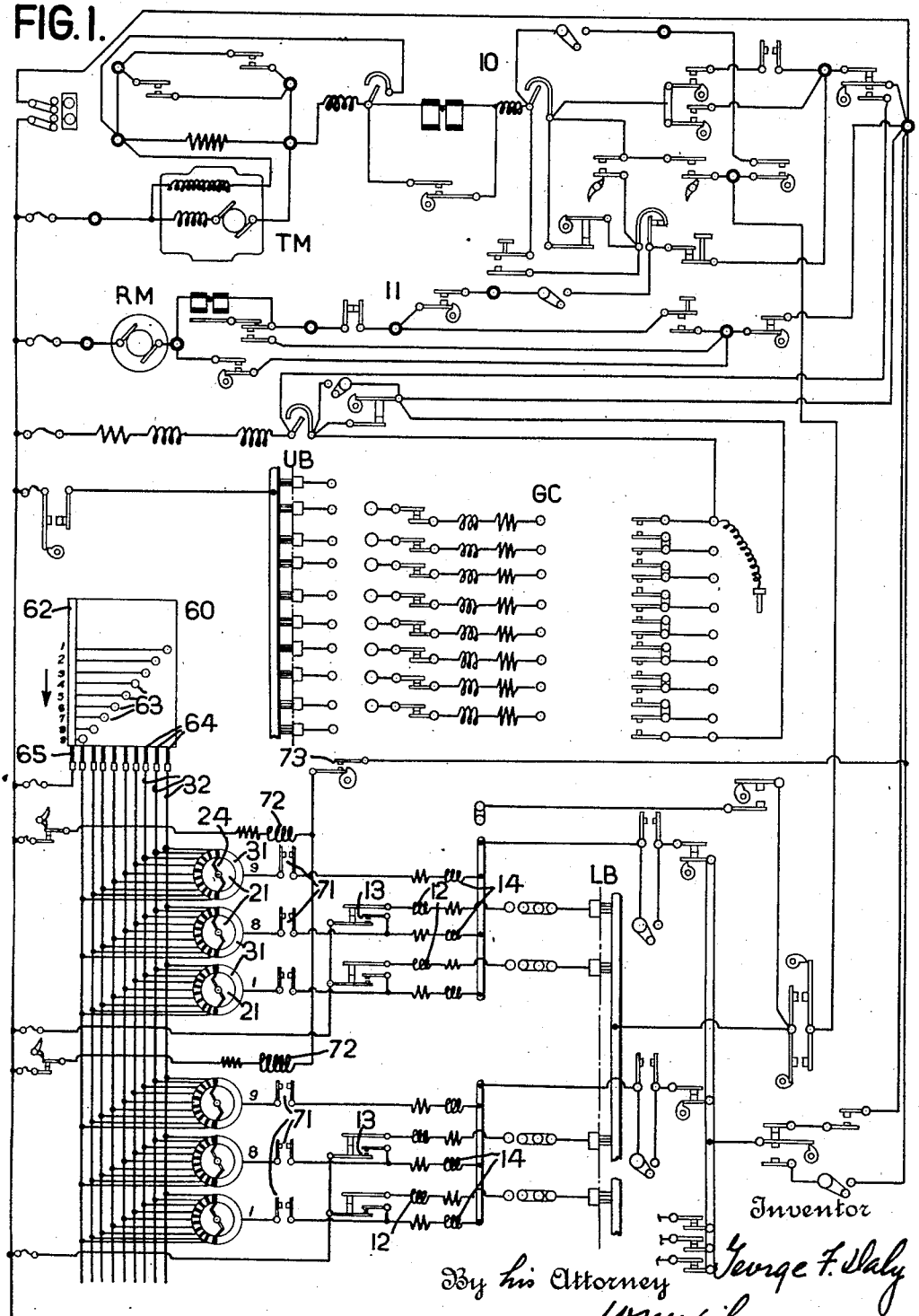

The diagram in Fig. 1 with the exception of the total taking device is entirely similar to that shown in the patent of Daly and Page, previously referred to. During adding operations the machine is driven by a tabulating motor TM controlled by a group of cam and relay controlled circuits indicated at 10 and is driven during total taking operations by a reset motor RM controlled by a group of circuits, contacts and relays designated generally at 11. When the tabulating motor TM is in operation it feeds the usual perforated tabulating cards, bearing differentially arranged index points representing digits, first, beneath the upper analyzing brushes UB and exactly one machine cycle later beneath the lower analyzing brushes LB. By means of the group control mechanism indicated generally at GC groups of cards, as represented by the same data entry in certain selected columns, may be operated upon separately, the items of each group being accumulated and the total of them taken before the machine begins operation on the following card group.

As the perforated cards pass the lower brushes their index points instantaneously close circuits through the proper lower analyzing brushes LB to energize counter magnets 12. As usual the timed energizations of these magnets control mechanism for entering the data corresponding to the card reading on the counter wheels. When any counter magnet 12 is energized it causes contacts 13 to close energizing a printer magnet 14 to select the type corresponding to the entered data for printing. In this fashion the accumulated items may be listed. These functions do not enter specifically into the present invention and will not be described in detail as they are well understood and fully described and explained in the patent previously mentioned.

Figure 2:
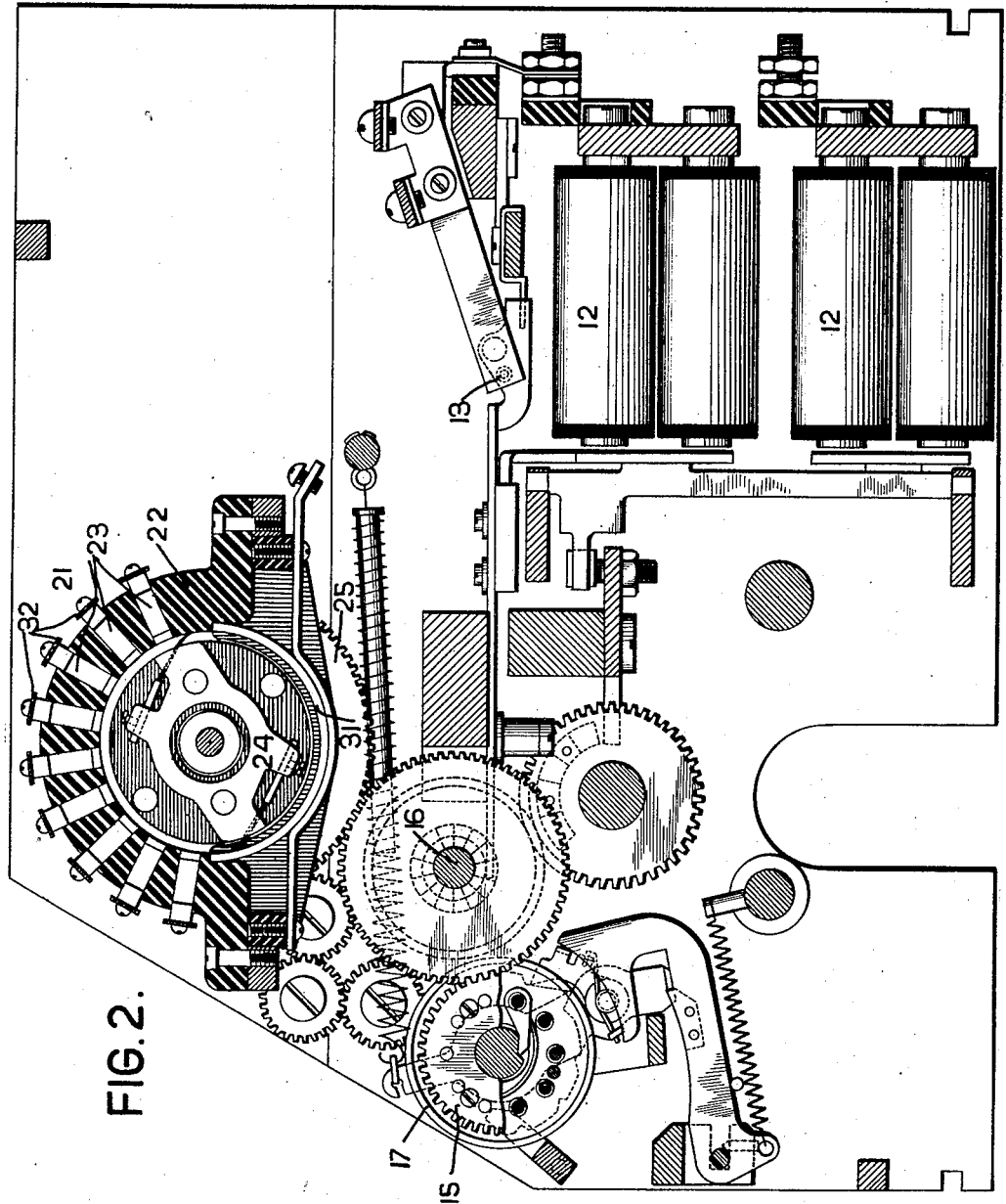
Fig. 2 is a vertical section through the counting section of the tabulator showing the relationship of the total reading commutators to the counting wheels.
Figure 3:
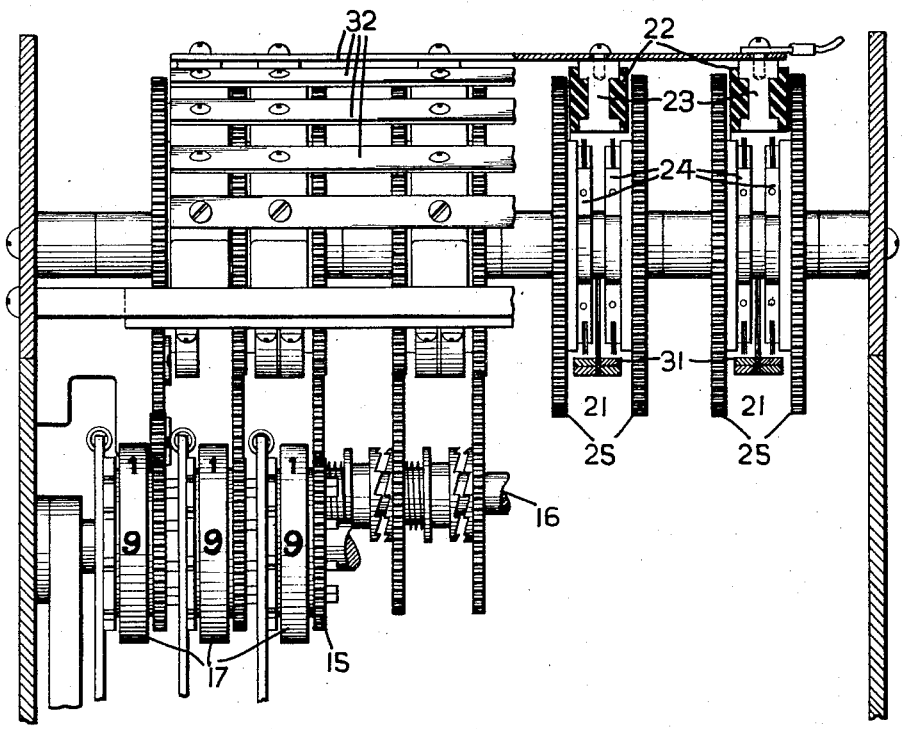
Fig. 3 is a front view of the counting section shown in Fig. 2.

Referring now to Figs. 2 and 3, the counter wheels are represented by gears 15 driven from a shaft 16 under control of the counter magnets 12 as previously stated. As usual, indicating wheels are provided at 17 fixed to the counter wheels so that the data entered on the counter wheels may be visually indicated.

The total taking mechanism indicated generally at 21 in the upper part of Fig. 2 consists of a commutator 22 provided with segments 23 corresponding in number and position to the several digit indicating positions of the counter wheel 15. A brush structure 24 is mounted on a gear 25 driven by the gear which drives the counter wheel 15 so that the brush structure is angularly displaced according to the reading on the counter wheel. The structure carries two brushes, one of which engages the segments 23 and the other of which engages a common segmental conductor 31 whose surface corresponds to the configuration of the commutator. Referring to Fig. 3, it will be noted that wherever possible one commutator 22 has been made to cooperate with two brush sets 24 to conserve space and simplify the structure. Each group of segments 23 corresponding to the same digit are connected to a common conducting bar 32 whereby all the "9" segments are in multiple, all the "8" segments in multiple, and so on.

In Fig. 4 is shown the printing mechanism through which the type bar 33 is positioned relatively the platen 34 to bring the proper type 35 into printing position opposite the platen. The total shaft 36 driven by the reset motor RM in Fig. 1 is provided with a cam 37 cooperating with a roller 38 carried on arm 39 freely rotatable on shaft 40. As the cam rotates arm 39 rocks clockwise and a lug 41 cooperating with an arm 42 fixed to shaft 40 also rocks clockwise. An arm 43 fixed to shaft 40 is linked to printing crosshead 44 which serves to raise the type bar 33 in synchronism with the total taking operation so that the type 35 successively pass printing position opposite platen 34. Owing to spring operated scissors connections 45, however, the type bars 33 may be arrested in any printing position without interfering with the upward movement of the crosshead 44. The type bars are arrested under control of the printing magnet 14. When this is energized it attracts its armature 51 and pulls a call wire 52 to the right thereby releasing a latch member 53 normally holding stop pawl 54. When the pawl 54 is so released it is spring operated to engage ratchet teeth 55 formed on the type bar 33 to prevent further upward movement of the type bar thus holding a particular type 35 in printing position.

Figure 5:
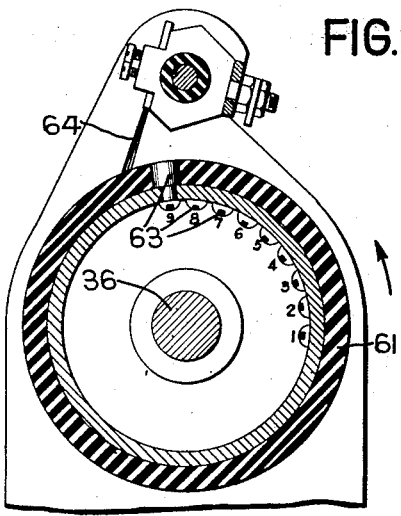
Fig. 5 is a detail of an emitting device for initiating the time operating impulses previously referred to, and Figs. 6 and 7 are details of a relay for switching in the total taking circuits during total taking operations.

The device for emitting the timed impulses synchronized with the movement of the type bars 33 to select the type for printing is shown in Figs. 1 and 5. This emitter consists of an insulating shell 61 suitably mounted on the total shaft 36 (or a shaft geared thereto so that it rotates in synchronism with the rise of the type bar 33 during total taking. Referring to Fig. 1, this emitter is provided with a continuous contact ring 62 and a plurality of contact spots 63, each of the latter being electrically connected to the ring 62. The spots 63 are displaced from each other both laterally and circumferentially, the circumferential spacing being such that each spot reaches a reading line formed by brushes 64 as the type corresponding to it on type bar 33 is passing printing position. The lateral offset of the spots 63 permits each to cooperate with a separate brush 64. These brushes are electrically connected with the bars 32 connecting the common commutator segments as shown in Fig. 3.

Hence it will be understood that each set of communtator segments 23 receives a timed impulse from the emitter at the time when the type corresponding to the segment is passing the printing line.

In order that there may be no possbility of the totaling circuits interfering with the listing circuits during adding operations provision is made for entirely disconnecting the commutators 22 and emitter 60 from the printing magnets during listing operations. This consists of relay contacts 71, one pair being in series in the total printing circuits of each printing magnet 14. A group of these contacts 71 is operated from a coil 72 whose energization is controlled from cam contacts 73 operated from the total shaft 36. During adding and listing operations contacts 73 are open but during totaling they close to energize the magnet 72 which energization results in the closing of associated relay contacts 71. The operation of this relay is illustrated in Figs. 6 and 7. The coils 72 have extending cores 81 shaped to form a circular opening 82 for accommodating an armature 83. The armature is pivoted at the center of the circular opening and suitable springs 84 normally hold it in the position shown in Fig. 6. When the magnet 72 is energized the armature 83 swings to a horizontal position thereby likewise swinging an elongated insulating member 86 mounted on the armature shaft to horizontal position (see Fig. 7) which insulating member cooperates with the contacts 71 to close them whenever the magnet coils 72 are energized.

The complete operation will now be briefly summarized from Fig. 1. The brush sets 24 during previous adding operations of the machine have been positioned according to the data reading of their associated adding wheels. Consequently one brush of the set rests upon a commutator segment corresponding to the reading of its wheel and the other brush rests on the segmental conductor 31 which is connected to the printing magnet 14 through relay contacts 71. The emitter which is driven during total taking brings its spots 63 successively into cooperation with the brushes 64 so that each of the bars 32 receives an impulse at the time when the type corresponding to them is passing printing position. As the "9" spot 63 passes its brush 64 the printer magnet of each counter wheel which stands at "9" receives an impulse to select the "9" type for printing. The circuit extends as follows: from brush 65 connected to one side of the line to common conducting ring 62 of the emitter thence through "9" spot 63 and its brush 64 and bar 32 to all the "9" segments of the commutators 21. If "9" is to be printed, a brush 24 will be in contact with this "9" segment and the circuit will be extended through the brush set 24 and segmental contact 31 to relay contact 71, thence through the printing magnet 14 and back to the other side of the line. In this fashion all type which are to print "9" will be positioned opposite the platen. The remaining type will be selected in similar manner according to the setting of the brush set 24 which corresponds to the counter reading. Thus in a single revolution of the emitter 60 all type which are to total print will be properly positioned opposite the platen to completely print the data represented on the several counter wheels.

What is claimed is:—

1. In a machine of the class described, an accumulating device comprising a plurality of denominational order elements for receiving and accumulating numerical data and a recording device for recording the data standing thereon, an emitter for emitting a single series of impulses representative of the several digits and means associated with the accumulating device for selecting for control of the recording device only such digit impulses as correspond to the numerical value represented on said accumulating device.

2. In a machine of the class described, an entry receiving device comprising a plurality of elements for receiving and retaining data and recording means for recording data standing thereon, an emitter for emitting a single series of impulses representative of the different possible data on the elements of said entry receiving device and means associated with each element for selecting only such impulses as correspond to the data represented on said element to control the recording means to effect recording of the composite data on said entry receiving device.

3. In a machine of the class described, an entry receiving device comprising a plurality of similar elements for receiving and retaining data of the same characteristics and manifested by similar condition changes in the several elements, recording mechanism for recording data from said device, mechanism for emitting a group of impulses consisting of a single impulse representative of each data representing condition of the elements and means associated with each element for selecting from the group of impulses the single impulse corresponding to its data representing condition to effect control of the recording mechanism.

4. In a machine of the class described, an accumulator having a plurality of denominational order elements each movable to different positions to represent the several digits, recording mechanism for recording data from said accumulator, an emitter, common to all the elements of the accumulator for emitting a group of impulses consisting of a single impulse representative of each digit and means associated with each denominational order element for selecting from the group only that impulse representing the digit corresponding to its position for controlling the recording mechanism.

5. In a machine of the class described, an entry receiving and retaining device having a plurality of similar elements each adapted to represent by different conditions different data of a group which group is the same for all the elements, a recording device for recording the different data of the group, means for controlling the recording device comprising a group of circuits common to said elements and equal in number to the different data which an element may represent and means associated with each element for connecting the circuit appropriate to its data representing condition to the recording device.

6. In a machine of the class described, an accumulator having a plurality of denominational order elements individually movable to different positions to represent digits, a recording mechanism having a plurality of denominational order elements each coordinated to an accumulator element and electrically controlled operating mechanism for each recording element to control the recording of the different digits, a single group of control circuits for the recording mechanism equal in number to the digits which may be represented by a single denominational order accumulator element, said group of circuits being common to said elements and means individually controlled by each accumulator element for selectively connecting the operating mechanism of its coordinated recording element to the control circuit appropriate to the accumulator reading.

7. In a machine of the class described, an entry receiving and retaining device comprising a plurality of similar data representing elements and a recording device comprising an impulse controlled member movable to different positions to effect recording of different data standing on said receiving device, an emitter common to the several data representing elements for emitting differentially timed impulses corresponding to the several data which may be represented by a single element, means for driving the emitter and member in synchronism to time the impulses with corresponding positions of the member and means associated with the receiving device for selecting and making effective for control of the member only the impulses corresponding to data readings on the several elements of the entry receiving device.

8. In a machine of the class described, an entry receiving and retaining device comprising a plurality of similar elements and a recording device comprising a plurality of impulse controlled members movable to different positions to effect a composite recording of the different data standing on the entry receiving device, an emitter common to the several elements for emitting a single group of differentially timed impulses corresponding to the possible data representations of a single element of said receiving device, means for driving said emitter and members in synchronism to time the impulses with corresponding positions of the members and individual means associated with each element of the receiving device for selecting and making effective for control of one of said members only the impulse corresponding to the component of the composite data represented by the said element.

9. In a machine of the class described, an entry receiving and retaining device comprising a plurality of similar elements and mechanism for transferring a data reading thereon to another data manifesting device, said mechanism comprising a plurality of members one for each element movable to different successive positions indicative of different data, an emitter common to the several elements for emitting a single group of timed impulses corresponding to the data which may be represented by any one of said receiving device elements, means for moving the emitter and members in synchronism to time the impulses with the successive positions of the members, means controlled by each receiving device element for selecting from said group of impulses only those corresponding to its reading and means controlled by the selected impulses for arresting the movement of the corresponding member whereby all the members may be positioned according to the composite data on the entry receiving device 10. In a machine of the class described, a plurality of similar entry receiving elements each capable of representing different characters of a predetermined group of characters, a plurality of recording devices one for each entry receiving element and each having a single electromagnetic device for controlling it to record the different characters, a group of circuits common to the several elements including a single circuit for each character which may be represented by one of the entry receiving elements and a commutator mechanism controlled by each entry receiving element for selectively connecting the electromagnet device of its recording device to the control circuit corresponding to the character represented by the entry receiving device.

11. A total taking mechanism for an accumulator provided with a plurality of denominational order elements, comprising a recording device including mechanism responsive to timed electrical impulses for representing digits, a group of control circuits common to the several elements equal in number to the digits to be represented and each corresponding to a digit, means for initiating impulses in the several circuits timed to adapt each to control said recording device to record a different digit, a commutator associated with each denominational order element having a segment connected to each control circuit and a brush associated with each denominational order element and settable by the same according to its reading to engage the proper segment to connect the recording device to the control circuit corresponding to the digit represented by the accumulating element.

12. A total taking mechanism for an accumulator provided with a plurality of denominational order elements, comprising a recording device, an emitter common to the several denominational order elements and including means for emitting a single impulse for each digit, and means controlled by the accumulator for distributing the impulses to the recording device according to the digit reading of each denominational order element.

13. A total taking mechanism for a multidenominational accumulator comprising a recording device having a plurality of denominational order recording elements, an emitter including means for emitting a single impulse representative of each digit and means controlled by the accumulator for distributing the impulses to the denominational order recording elements according to a multidenominational reading of the accumulator.

14. A total taking mechanism for a multidenominational accumulator comprising a recording device having a plurality of electrically controlled denominational order recording elements, a group of circuits including a single circuit corresponding to each digit for controlling the recording elements and means controlled by the accumulator for selectively connecting the circuits to the several denominational order recording elements according to a multidenominational reading of the accumulator.

GEORGE F. DALY.